US006967738B1

(12) United States Patent
Shima

(10) Patent No.: US 6,967,738 B1
(45) Date of Patent: Nov. 22, 2005

(54) NETWORK-CONNECTABLE PRINTER, CONTROLLER THEREFOR, AND METHOD FOR CONTROLLING THIS CONTROLLER

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/385,102

(22) Filed: Aug. 27, 1999

(30) Foreign Application Priority Data

Feb. 5, 1999 (JP) ................................ 11-028739

(51) Int. Cl.[7] ............................................ G06F 15/00

(52) U.S. Cl. .................. 358/1.16; 358/1.13; 358/1.15; 358/1.17; 358/443; 358/444

(58) Field of Search ............................ 358/1.15, 1.16, 358/1.17, 443, 444, 1.13

(56) References Cited

U.S. PATENT DOCUMENTS

| | | | | |
|---|---|---|---|---|
| 4,992,958 A | | 2/1991 | Kageyama et al. | 364/519 |
| 5,550,957 A | | 8/1996 | Davidson, Jr. et al. | 395/114 |
| 6,029,238 A | * | 2/2000 | Furukawa | 712/1 |
| 6,449,056 B1 | * | 9/2002 | Mishima et al. | 358/1.16 |
| 6,538,764 B2 | * | 3/2003 | Ueda | 358/1.16 |

FOREIGN PATENT DOCUMENTS

| | | |
|---|---|---|
| JP | 9-286152 | 11/1997 |
| JP | 10-111769 | 4/1998 |
| JP | 10-232752 | 9/1998 |
| JP | 10-254721 | 9/1998 |

OTHER PUBLICATIONS

Patent Abstract of Japan, Publication No. 10232752 A, Publication Date Sep. 2, 1998, 1 Page.

(Continued)

*Primary Examiner*—Edward Coles
*Assistant Examiner*—Chan S. Park
(74) *Attorney, Agent, or Firm*—Osha Liang LLP

(57) ABSTRACT

The present invention is a printer controller comprising a processor that exclusively executes a communication task for receiving packet data from host computers and extracting print job data on the basis of the received packet data, a language task for generating image data on the basis of the above-mentioned print job data, and a print task for controlling a print engine, according to priorities assigned to each of these tasks. The priorities assigned to the communication task and language task are altered according to specific conditions. For example, if the amount of packet data to be processed by the communication task is below a specific value, the priority of the language task is altered to be higher than the priority of the communication task, whereas if the amount of packet data to be processed by the communication task is over a specific value, the priority of the communication task is altered to be higher than the priority of the language task. Also, if the amount of print job data to be processed by the language task is below a specific value, the priority of the communication task is altered to be higher than the priority of the language task, whereas if the amount of print job data to be processed by the language task is over a specific value, the priority of the language task is altered to be higher than the priority of the communication task.

19 Claims, 9 Drawing Sheets

OTHER PUBLICATIONS

Patent Abstract of Japan, Publication No. 10254721 A, Publication Date Sep. 25, 1998, 1 Page.

Patent Abstract of Japan, Publication No. 09286152 A, Publication Date Nov. 4, 1997, 1 page.

Patent Abstract of Japan, Publication No. 10254721 A, Publication Date Sep. 25, 1998, 1 page.

Japanese Patent Abstracts Publication No. 10111769 A, Publication Date Apr. 28, 1998, 1 page.

Japanese Office Action, with partial translation dated Aug. 28, 2001, 6 pages.

European Search Report, Dated Jan. 23, 2002.

* cited by examiner

NETWORK-CONNECTABLE PRINTER, CONTROLLER THEREFOR, AND METHOD FOR CONTROLLING THIS CONTROLLER

BACKGROUND OF THE INVENTION

1. Field of the Invention

The present invention relates to art for a printer connectable to a network and to a controller therefor. More particularly, the present invention relates to art for a multitask program that is executed by this controller.

2. Description of the Related Art

Pursuant to the advancement in network technology in recent years, printers have come to be connected to a network via a network interface and shared by a plurality of host computers.

This network interface is equipped with a dedicated processor and a buffer, and communicates with the host computers by a specific protocol, thereby receiving printing job data and storing them in the buffer. The controller connected to the printer unit is also equipped with a processor, and prints by receiving image data stored in the network interface buffer whenever necessary, while generating image data and issuing control commands to a print engine.

Specifically, with the above-mentioned conventional network printer, the network interface and the controller each have a processor, and the network interface and the controller are connected by internal dedicated buses. Consequently, the processor of the controller performs its print control while making image data transmission requests to the network interface so that there is no undesired variance in the printing results, without any consideration given to controlling the communication with the host computers.

SUMMARY OF THE INVENTION

The first gist of the present invention is that a printer controller exclusively executes communication control means for receiving packet data from host computers and extracting print job data on the basis of the received packet data, language control means for generating image data on the basis of the above-mentioned print job data, and print control means for supplying the above-mentioned image data to a print engine, according to priorities assigned to each of these tasks. In this case, the priorities assigned to the communication control means and language control means are altered according to specific conditions.

For example, if the amount of packet data to be processed by the communication control means is below a specific value, the priority of the language control means is altered to be higher than the priority of the communication control means. On the other hand, if the amount of packet data to be processed by the communication control means is over a specific value, the priority of the communication control means is altered to be higher than the priority of the language control means.

Also, if the amount of print job data to be processed by the language control means is below a specific value, the priority of the communication control means is altered to be higher than the priority of the language control means. On the other hand, if the amount of print job data to be processed by the language control means is over a specific value, the priority of the language control means is altered to be higher than the priority of the communication control means.

The second gist of the present invention is that a printer controller exclusively executes, in round-robin, communication control means for receiving packet data from host computers and extracting print job data on the basis of the received packet data, language control means for generating image data on the basis of the above-mentioned print job data, and print control means for controlling a print engine. In this case, the time ratio between the execution time of the communication control means and the execution time of the language control means is altered according to specific conditions.

For example, if the amount of packet data to be processed by the communication control means is below a specific value, the execution time of the language control means is altered to be longer than the execution time of the communication control means. On the other hand, if the amount of packet data to be processed by the communication control means is over a specific value, the execution time of the communication control means is altered to be longer than the execution time of the language control means.

Also, if the amount of print job data to be processed by the language control means is below a specific value, the execution time of the communication control means is altered to be longer than the execution time of the language control means. On the other hand, if the amount of print job data to be processed by the language control means is over a specific value, the execution time of the language control means is altered to be longer than the execution time of the communication control means.

The various means described for the present invention can be realized by programs. A program is stored on a recording medium. Examples of recording media include a ROM or RAM, as well as a hard disk (HD), DVD-RAM, DVD-ROM, flexible disk (FD), and CD-ROM.

BRIEF DESCRIPTION OF THE DRAWINGS

FIG. 1A is a block diagram illustrating the simplified structure of the printer pertaining to the present invention, while

DESCRIPTION OF THE PREFERRED EMBODIMENTS

Preferred embodiments of the present invention are described in detail through reference to the appended drawings.

First Embodiment

Figure 1A:
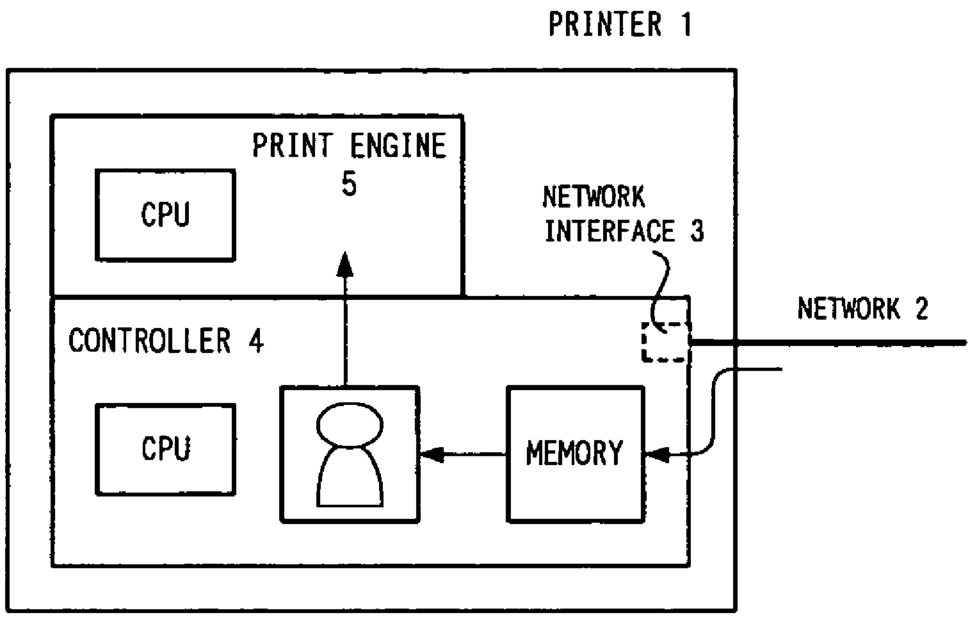
Figure 1B:
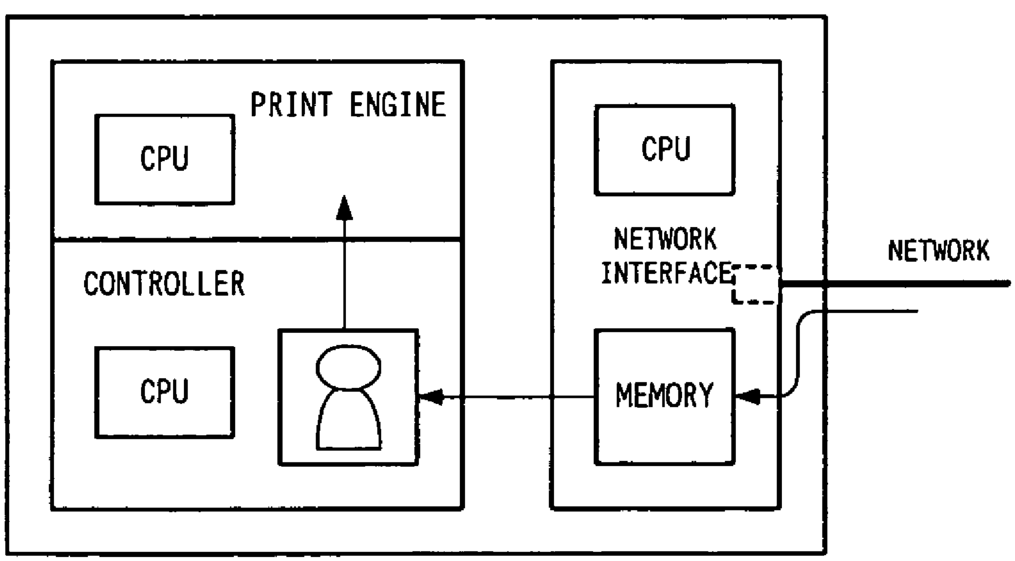
FIG. 1B is a block diagram illustrating the simplified structure of a conventional printer.

FIG. 1A illustrates the structure of the printer pertaining to the present invention. As shown in FIG. 1A, the printer 1 pertaining to the present invention is characterized in that a controller 4 receives packet data via a network interface 3 connected to a network 2 so as to allow communication with host computers (not shown), generates image data on the basis of this packet data, and controls a print engine 5. In other words, with the printer pertaining to the present invention, the network interface and the controller do not have and are not controlled by independent CPUs (processors), as with the network-connectable printer shown in FIG. 1B.

Therefore, the term "network interface" in the present invention does not refer to one having a processor independent from the processor of the controller for network communication, and instead merely refers to an interface portion connected to a network and a controller.

Figure 2:
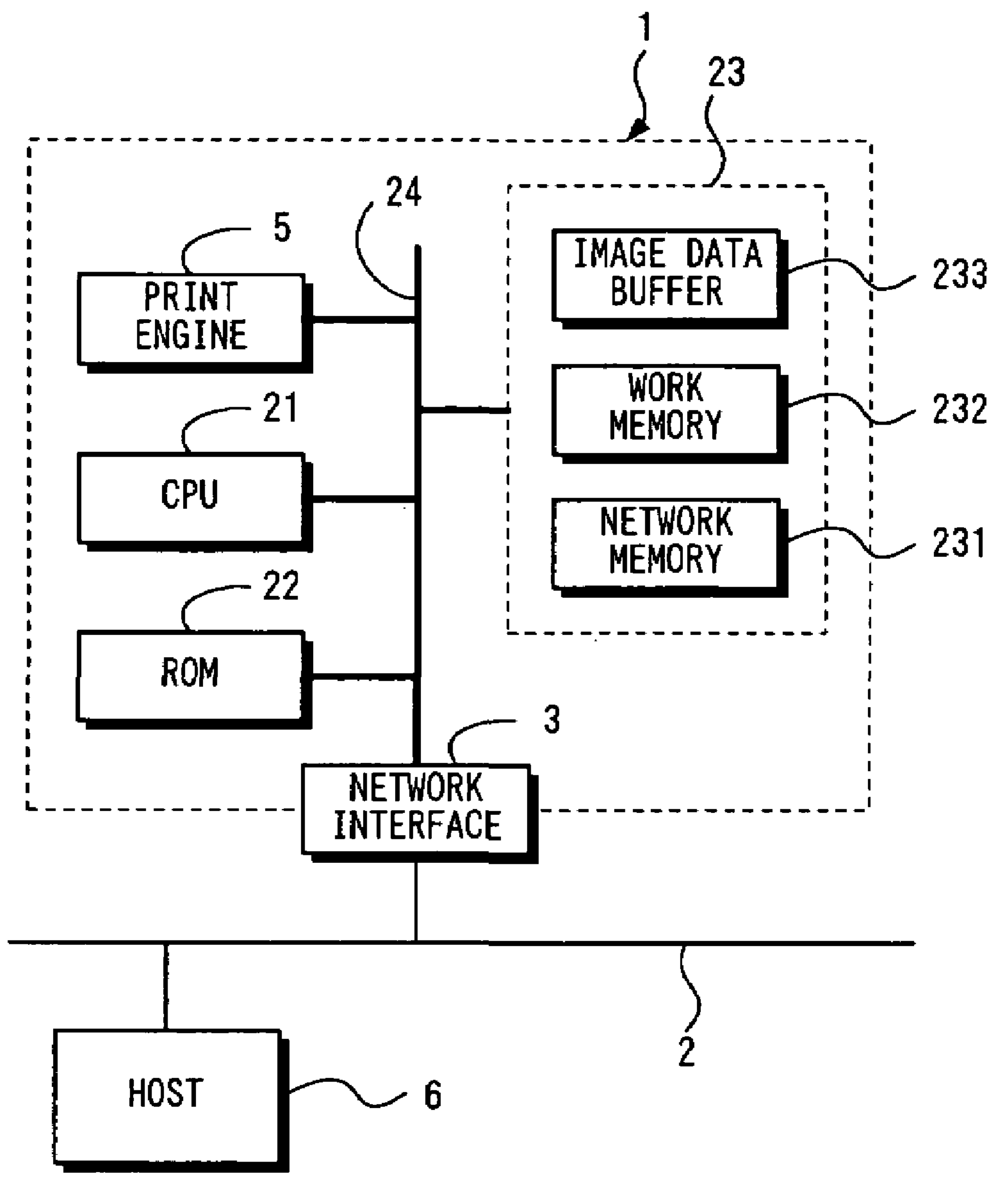
FIG. 2 is a block diagram illustrating the structure of the printer in the first embodiment.

FIG. 2 illustrates the structure of the printer pertaining to this embodiment. As shown in this figure, the printer 1 is connected so that it can communicate with a host computer (hereinafter referred to as "host") 6 via the network 2. The printer 1 is equipped with a network interface 3 connected to the network, a CPU 21, a ROM 22 that stores a program for implementing a specific function that is executed by this CPU 21, a RAM 23 available for the execution of the CPU 21, and a print engine 5, and these components are connected to a bus 24.

The network interface 3 detects self-addressed packet data on the network and sends it to the CPU 21 via the bus 24, and performs processing for putting packet data sent from the CPU 21 to the host 6 on the network.

The CPU 21 executes a specific program stored in the ROM 22 and implements specific functions by operating in conjunction with other hardware. The program in this embodiment is equipped at least with functions for receiving packet data (communication control), generating image data (language control), and controlling the print engine 5 (print control), and with a function for managing these functions. Also, the specific program is stored in the ROM 22 in this embodiment, but it may instead be stored in an external storage device such as a hard disk and be executed by the CPU 21 by being loaded into the RAM 23 as needed.

The RAM 23 is comprised of a network memory 231, a work memory 232, and an image data buffer 233. These may be physically independent, or a single memory may be theoretically partitioned. The network memory 231 temporarily stores packet data received by the network interface 3. The work memory 232 temporarily stores data related to print job data in which the header portion has been excluded from the packet data stored by the network memory 231. The image data buffer 233 stores image data generated on the basis of the print job data stored in the work memory 232.

The print engine 5 includes, for example, a paper feed mechanism, a printing head, and the like, and serves to print on paper or another such printer medium. The print engine 5 can be any of various engines corresponding to a line printer that prints in units of one line, a serial printer that prints in units of one character (such as and ink jet printer or a heat transfer printer), a page printer that prints in page units (such as a laser printer), or the like.

Figure 3:
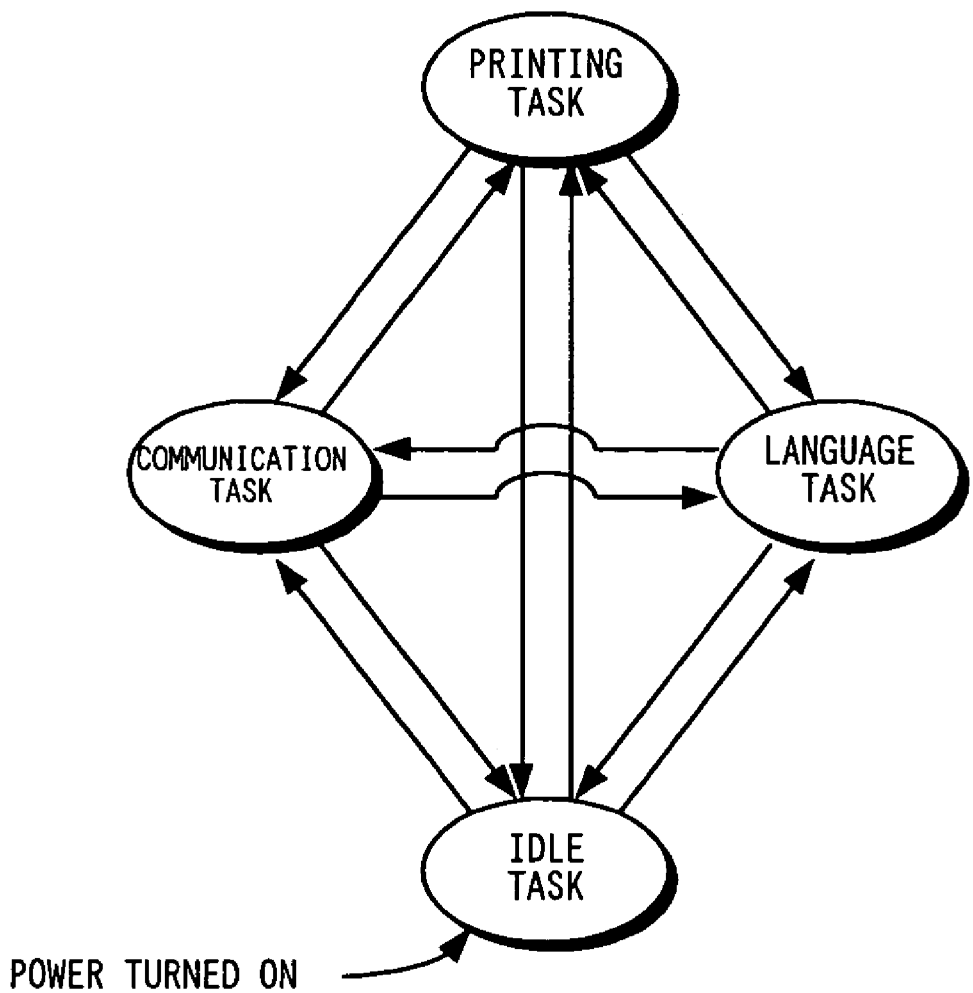
FIG. 3 conceptually illustrates the operation of the programs pertaining to the first embodiment.

FIG. 3 schematically illustrates the operation of the program pertaining to this embodiment. In other words, this figure is a transition diagram illustrating the task to which the CPU 21 is allocated, and the tasks to which it is switched and allocated. The program in this embodiment may be considered as a plurality of tasks (sometimes referred to as "processes") exclusively executed by the CPU 21. Specifically, in this embodiment, the CPU 21 exclusively executes a printing task for controlling a print engine 5, a communication task for controlling communication with host computers, a language task for generating image data, and an idle task for maintaining an idle state, all under the control of a management task that is superior to these tasks. The management task performs priority changes, scheduling, dispatches, and so forth, and typically corresponds to an operating system. The printing task, communication task, and language task are put in an execution queue using a predetermined event as a trigger, and are executed after being scheduled on the basis of their priority. In other words, the task with the highest priority among the tasks in an executable state is executed by the CPU 21. The events include external interrupts, timer interrupts, and so on.

An idle task is a task executed for event stand-by. The lowest priority is assigned to an idle task. Therefore, an idle task is executed when none of the other tasks discussed below is being executed. For instance, an idle task is executed immediately after the power has been turned on to the printer, or upon completion of printing.

The communication task enters an executable state by an interrupt occurring as a result of the network interface 3 receiving self-addressed packet data. A communication task communicates with the host 6 to receive packet data, and excludes the unnecessary header section from the packet data to extract print job data. In this case, the communication task stores the received packet data in the network memory 231 according to the network communication status and the print job data extraction status, while performing the extraction of the above-mentioned print job data and storing it in the work memory 232. The communication task goes into a sleep mode when the extraction of the printing job data is complete.

The language task enters an executable state by receiving print job data extraction message from the communication task. The language task generates image data according to a print request stored in the work memory 232, and writes this image data to image data buffer 233. The printing task is notified of a print request message when the image data required for printing (such as one band or page of image data) has been generated, and goes into the sleep mode when there is no more print job data.

The printing task enters an executable state when a print request message is received, or when a data transfer request interrupt from the print engine 5 is received. First of all, when a print request message is received, a printing task issues a paper feed command to the print engine 5 and temporarily returns to the sleep mode. The print engine 5 receives this paper feed command, controls the paper feed mechanism or the like, prepares the state required for printing commencement, and orders a data transfer request interrupt to the CPU 21. When there is a data transfer request interrupt from the print engine 5, with a page printer, for example, the printing task executes one band of printing control. In this case, the printing task executes the printing control while monitoring the status of the print engine 5. Specifically, the printing task monitors the paper feed control of the print engine 5 and other such aspects of progress status. The printing task releases the CPU 21 when all of the print control processing based on the print request has been completed.

If the resources required by any of the above-mentioned tasks cannot be ensured even though that task is in an executable state, the other tasks that are in an executable state are allocated to the CPU 21. For instance, with a communication task, a self-addressed packet may not arrive from the network (because packets of many different destinations are carried over the network and the self-addressed packet only arrives intermittently), or the network memory 231 may be full. With a communication task, the print job data may be processed, or the image data buffer 233 may be full, for example. Furthermore, with a printing task, the portion being printed by the print engine may overlap the blank portion of the paper margin and some of the data to be processed may be lost, or the margin portion of the paper or the paper supply timing may result in a stand-by mode, for example.

The characteristic feature of this embodiment is that the various tasks are executed in their order of priority, and when a specific event occurs, the order of priority of specific tasks is altered. In other words, each task is assigned a priority and is executed according to this priority. When a specific event occurs during the execution of a given task, the task to be executed in response to this event is altered so that its priority is relatively higher, even if it starts out with a low priority, and is therefore executed.

In the initial state, the priority order based on the priority assigned to each task is set in the order of printing task, communication task, language task, and idle task. The priority of a communication task and/or language task is altered when a specific event occurs, and the relative priority orders thereof are changed. Priority is not an absolute value, and the relative priority order may be determined among these tasks.

Next, the printer controller pertaining to this embodiment will be functionally expressed and described through reference to a function block diagram consisting of functional realization means.

Figure 4:
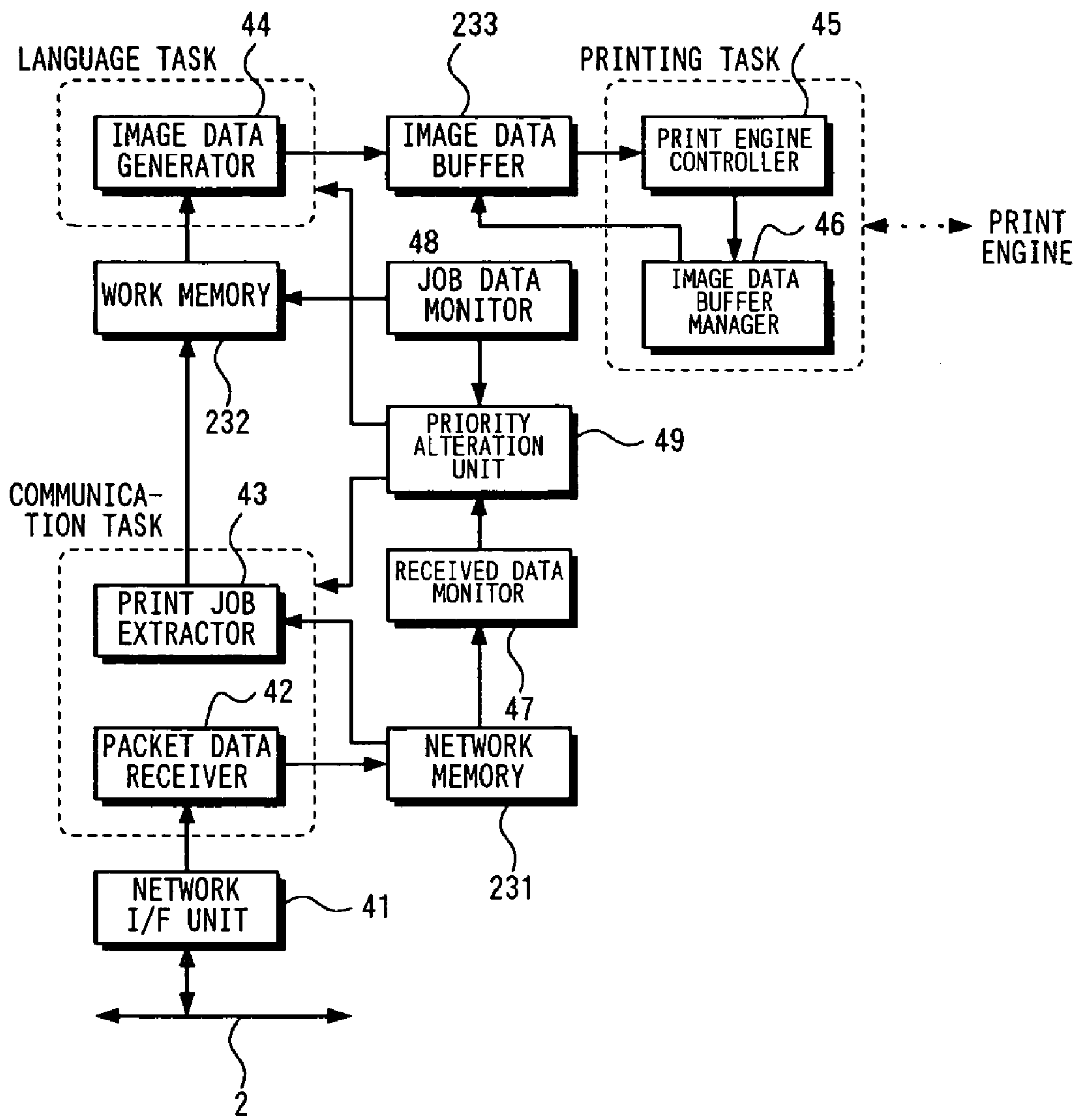
FIG. 4 is a block diagram of the printer controller pertaining to the first embodiment.

FIG. 4 is a function block diagram of the printer controller pertaining to this embodiment. As shown in this figure, a network interface 41 (corresponds to the above-mentioned network interface 3) monitors the network 2, and orders an interrupt to the CPU 21 when self-addressed packet data arrives. The communication task makes a transition to the executable state based on the interrupt. A packet data receiver 42 receives the arriving packet data and writes it to the network memory 231 when an execution right is assigned to a communication task as a result of scheduling. A print job extractor 43 extracts print job data excluding the header section from the packet data stored in the network memory 231, and writes this to the work memory 232. When the extraction of the print job data is complete, the print job extractor 43 sends a print job extraction complete message to the language task.

When a language task is in an executable state and an execution right has been assigned to the language task as a result of scheduling, an image data generator 44 generates image data on the basis of the print job data stored in the work memory 232, and writes it to the image data buffer 233. The image data generator 44 sends a print request message to the printing task at the point when the amount of image data required for printing has been generated.

When a printing task is in an executable state and an execution right has been assigned to the printing task as a result of scheduling, a print engine controller 45 sends a paper feed command to the print engine 5, and sends image data to the print engine 5 according to the operated status of the print engine 5 at the point when the printing preparations are complete. Also, once the printing corresponding to the assigned printing request is complete, the print engine controller 45 notifies an image data buffer manager 46 to this effect. The image data buffer manager 46 receives this notification and clears the image data stored in the image data buffer 233.

A received-data monitor 47 monitors the amount of packet data stored in the network memory 231 (amount of received data), and orders an interrupt to the CPU 21 if the amount of received-data is a specific value.

A job data monitor 48 monitors the amount of print job data stored in the work memory 232 (amount of job data), and orders an interrupt to the CPU 21 if the amount of job data is a specific value.

A priority alteration unit 49 is executed on the basis of the interrupt from the received data monitor 47 or the job data monitor 48, and alters the priority assigned to the communication task and/or the language task. In other words, the priority alteration unit 49 alters the priority so that the relative order of priority between the communication task and the language task is changed.

The various function realization means structured as above are exclusively allocated and executed by the CPU 21 according to the priorities discussed above. That is, when the execution of another task is requested by the occurrence of a specific event (interrupt) during the execution of a given task, the priorities are compared between the task being executed and the task for which execution has been requested, and the task whose priority is higher is executed at that point.

For instance, if a communication interrupt occurs during the execution of the image data generator 44, the priorities will be compared between the communication task and the language task. As a result, if the priority of the communication task is higher priority than the priority of the language task, the execution of the packet data receiver 42 will begin. Conversely, if the priority of the language task is higher than the priority of the communication task, the execution of the image data generator 44 will continue. Similarly, if a data transfer request interrupt from the print engine 5 occurs, a printing task which has the highest priority will begin the execution of the print engine controller 45. Also, if a data transfer request interrupt occurs during the execution of the packet data receiver 42, because the priority of the printing task is higher than that of the communication task, the execution of the print engine controller 45 will begin.

When a certain task completes the execution of a given processing, it returns to the sleep mode. In this case, the task in an executable state with the next highest priority will be allocated to the CPU 21 and executed at that point.

Figure 5:
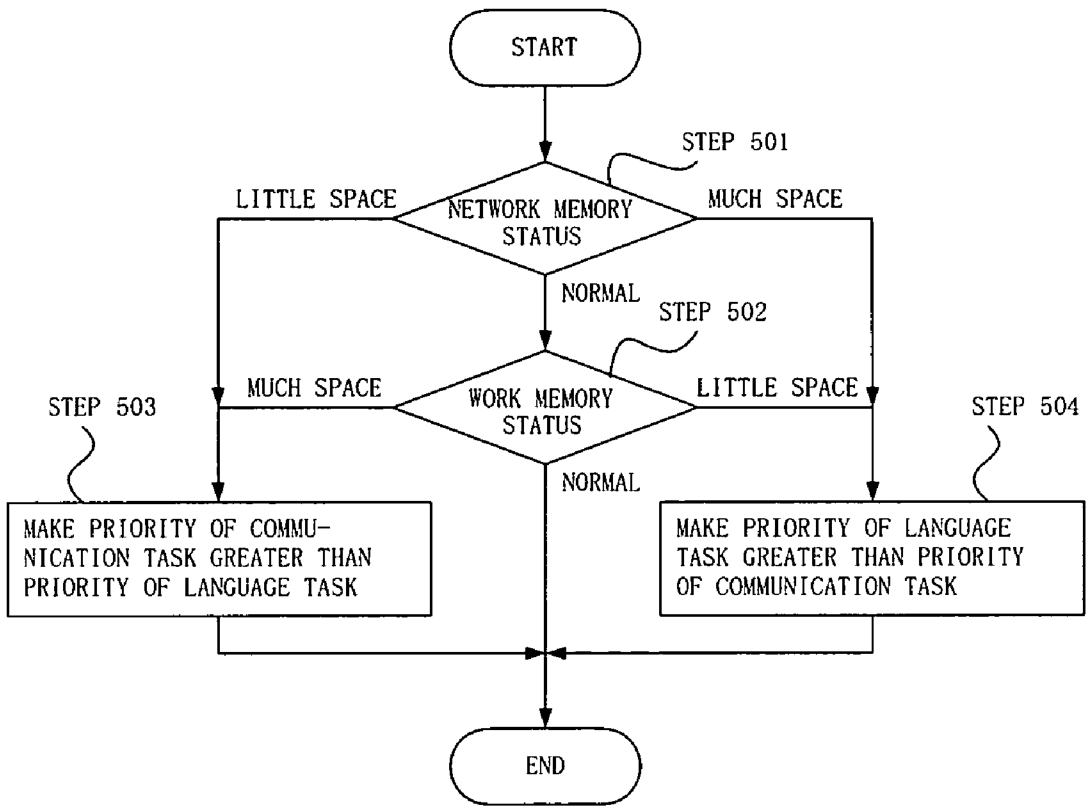
FIG. 5 is a flow chart illustrating an operation example of the printer controller pertaining to the first embodiment.

FIG. 5 is a diagram illustrating the alteration of task priority in this embodiment. The received data monitor 47 periodically monitors the state of the network memory 231 (step 501). Specifically, if it determines that the amount of packet data stored in the network memory 231 (amount of received data) is large (over a specific value), i.e., that there is little free space in the network memory 231, then the received data monitor 47 notifies the priority alteration unit 49 to this effect. Upon receiving this notification, the priority alteration unit 48 sets the priority of the communication task higher than the priority of the language task (step 503). Conversely, if it determines that the amount of packet data stored in the network memory 231 (amount of received data) is small (below a specific value), i.e., that there is much free space in the network memory 231, then the received data monitor 47 notifies the priority alteration unit 49 to this effect. Upon receiving this notification, the priority alteration unit 49 sets the priority of the language task higher than the priority of the communication task (step 504).

After the decision of the received data monitor 47, the job data monitor 48 determines the status of the work memory 232 (step 502). Specifically, if the job data monitor 47 determines that the amount of job data stored in the work memory is small, i.e., that there is much free space in the work memory 232, then it notifies the priority alteration unit 48 to this effect. Upon receiving this notification, the priority alteration unit 48 sets the priority of the communication task to a higher value than the priority of the language task (step 503). Conversely, if the job data monitor 48 determines that the amount of job data stored in the work memory 232 is large, i.e., that there is little free space in the work memory 232, then it notifies the priority alteration unit 49 to this effect. Upon receiving this notification, the priority alteration unit 49 sets the priority of the language task to a higher value than the priority of the communication task (step 504).

As long as there is no conflict in the processing results, the order of the processing may be switched in the above-mentioned operation of the printer controller.

Figure 6:
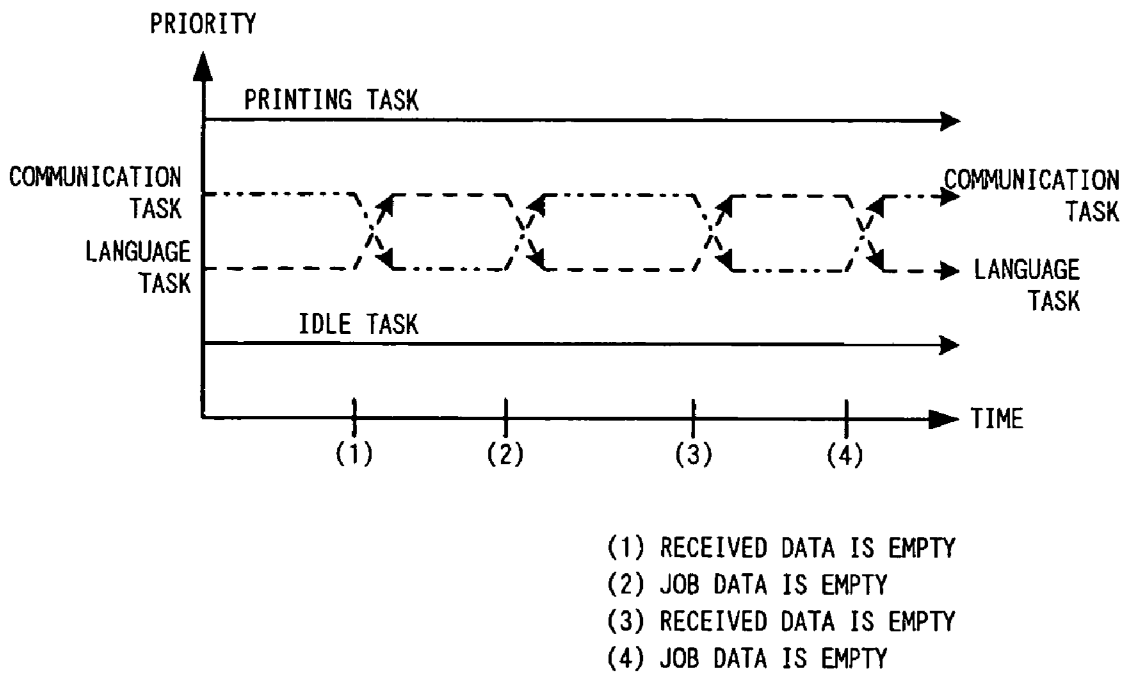
FIG. 6 is a timing chart illustrating an operation example of the printer controller pertaining to the first embodiment.

FIG. 6 is a diagram illustrating an example of priority switching in this embodiment. In this figure, the horizontal axis is the time axis, and the vertical axis is the priority.

(1): When the received data monitor 47, which periodically monitors the amount of data received by the network memory 231, determines that the amount of data received by the network memory 231 is below a specific value, it notifies the priority alteration unit 49 to this effect. The priority alteration unit 49 alters the priorities of the communication task and language task so that the priority of the language task is higher than the priority of the communication task.

(2): When the job data monitor 48, which periodically monitors the amount of job data of the work memory 232, determines that the amount of job data of the work memory 232 is below a specific value, it notifies the priority alteration unit 49 to this effect. The priority alteration unit 49 alters the priorities of the communication task and language task so that the priority of the language task is higher than the priority of the communication task.

(3): Just as in (1) above, the priority alteration unit 49 alters the priorities of the communication task and language task so that the priority of the language task is higher than the priority of the communication task.

(4): Just as in (2) above, the priority alteration unit 49 alters the priorities of the communication task and language task so that the priority of the communication task is higher than the priority of the language task.

As above, with this embodiment, the processing that used to be performed independently by the processor provided to the network interface and by the processor provided to the controller can now be executed by just the processor provided to the controller. Therefore, there is no need for a conventional network interface, which saves the time that would be required to install the network interface in an expansion slot or the like.

Also, since communication control, language control, and print control are carried out by the processor of the controller, all of these need to be controlled so as to satisfy the requirements assigned to each control. In this embodiment, however, a priority is assigned to each control (task) and execution is controlled on the basis of these priorities, so printing can be carried out with no conflict. In particular, with this embodiment, the highest priority is assigned to print control, and the priorities of communication control and language control are dynamically altered in response to the amount of data to be processed so that no undesired variance occurs in the printing results, which means that the processing can be carried out more efficiently.

Second Embodiment

This embodiment is characterized in that tasks are executed in round-robin by time slice, and when a specific event occurs during the execution of these tasks, the time that a specific task occupies the processor is altered.

Figure 7:
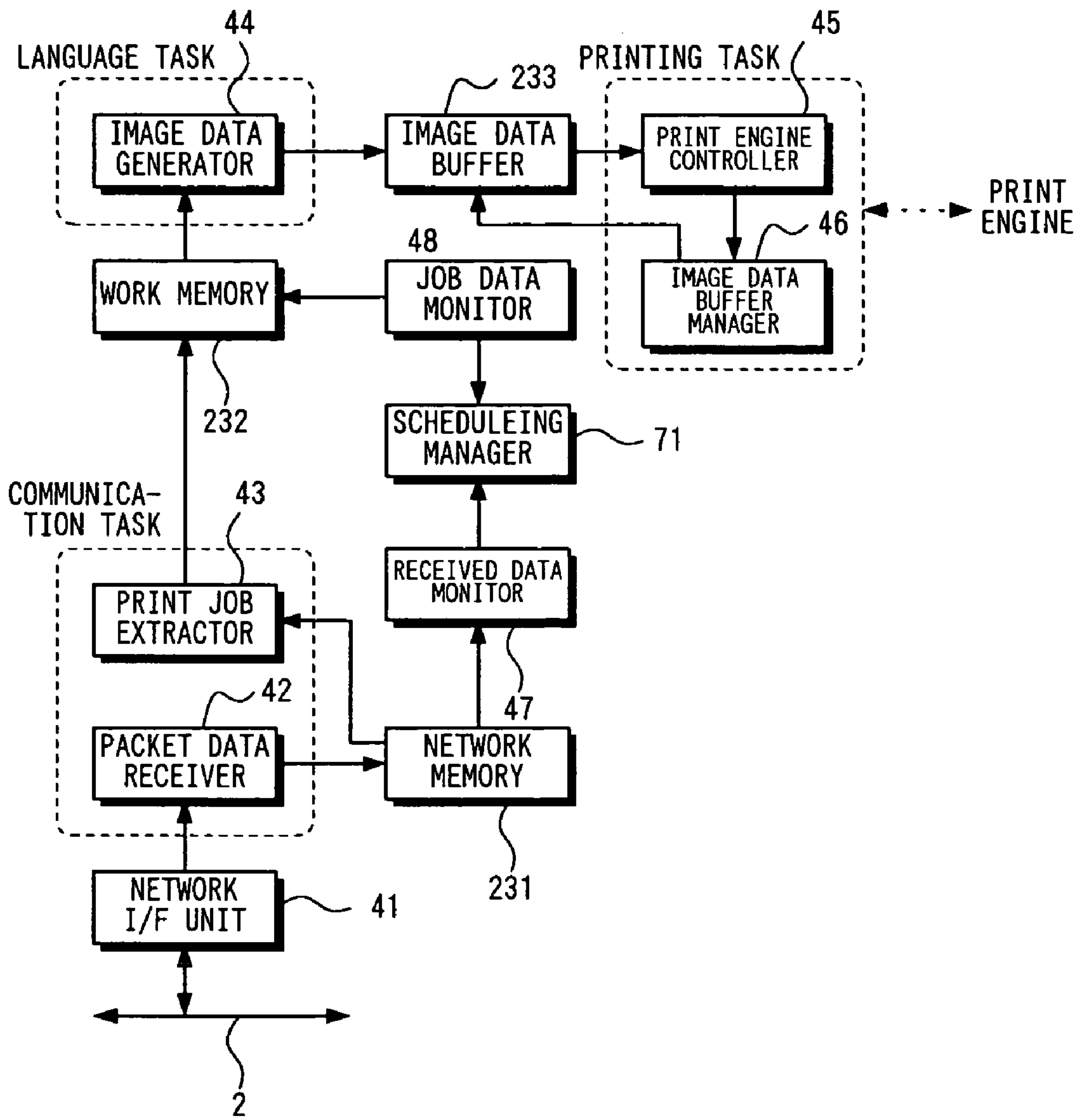
FIG. 7 is a flow chart illustrating the operation of the scheduling manager pertaining to the second embodiment.

FIG. 7 is a function block diagram of the printer controller pertaining to this embodiment. In this figure, those elements that are the same as in the first embodiment are labeled the same.

A scheduling manager 71 manages the time that a task can occupy the CPU 21 (hereinafter referred to as the "processor occupancy time"). Specifically, the scheduling manager 71 stores the processor occupancy time for each task. The scheduling manager 71 also monitors the processor occupancy time of tasks being executed by the CPU 21 on the basis of clock signals produced by a timer (not shown), and orders an interrupt to the CPU 21 at the point when the processor occupancy time has elapsed. Furthermore, when an interrupt occurs as a result of the received-data monitor 47 or the job data monitor 48, the scheduling manager 71 alters the processor occupancy time of a specific task according to the details of this event.

The other function realization means thereof are the same as in the first embodiment.

Figure 8:
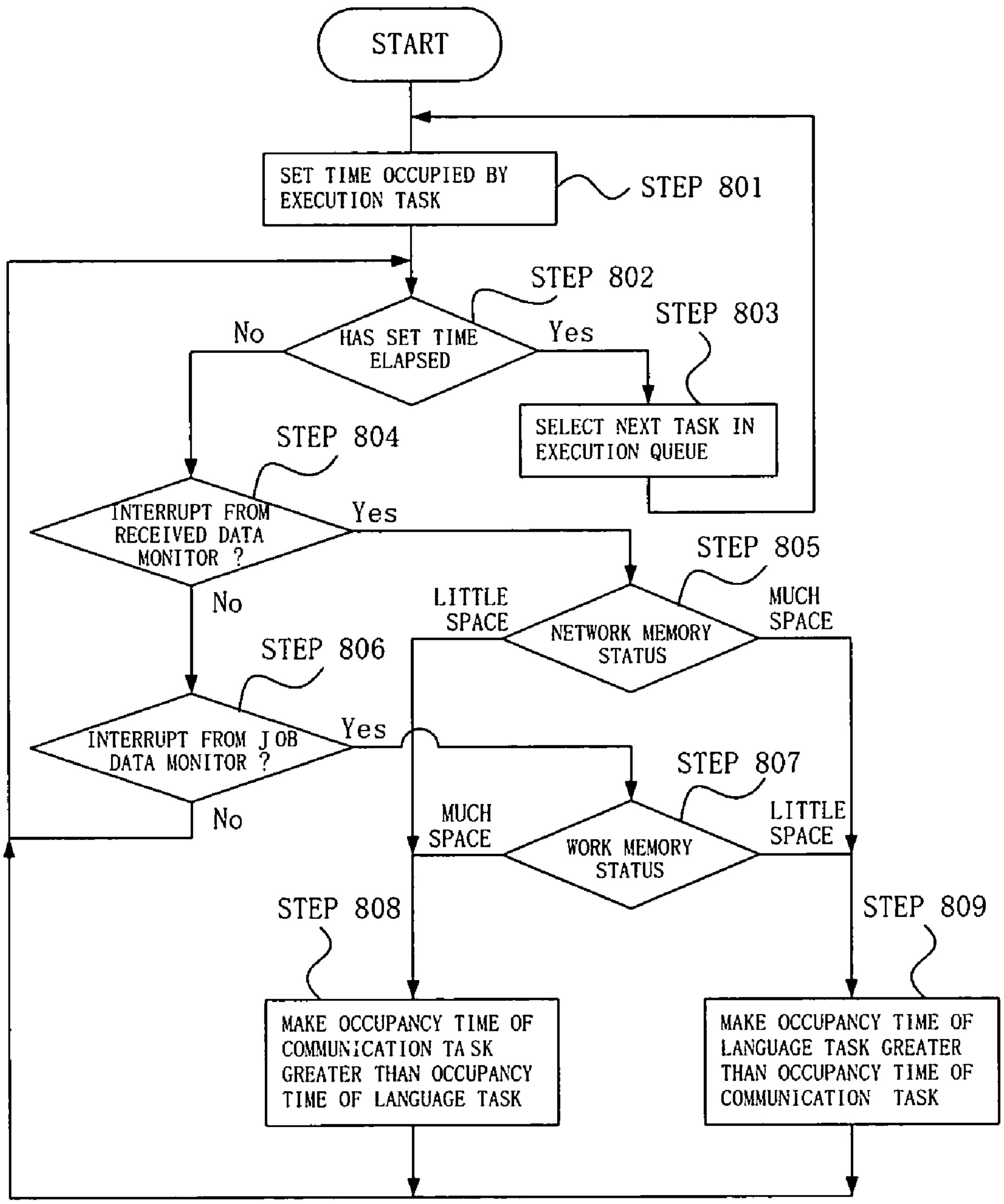
FIG. 8 is a block diagram of the printer controller pertaining to the second embodiment.

FIG. 8 is a diagram illustrating the operation of the scheduling manager 71 pertaining to this embodiment. The scheduling manager 71 sets the processor occupancy time for each task that has been put in an execution queue by the CPU 21 when this task is to be executed anew (step 801). The scheduling manager 71 monitors the time that the CPU 21 executes a task. Specifically, the scheduling manager 71 measures the execution time of a certain task, and determines whether the processor occupancy time set for that task has elapsed (step 802). When it determines that the processor occupancy time has elapsed, the scheduling manager 71 orders an interrupt to the CPU 21 and selects the next task in the execution queue (step 803). As a result, the CPU 21 begins the execution of the next task in the execution queue, and the timer-interrupted task is put at the end of the execution queue.

Figure 9A:
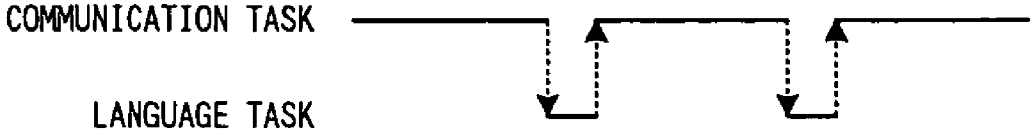
FIG. 9A and FIG. 9B are charts illustrating the time occupied by the processor in the second embodiment.
Figure 9B:
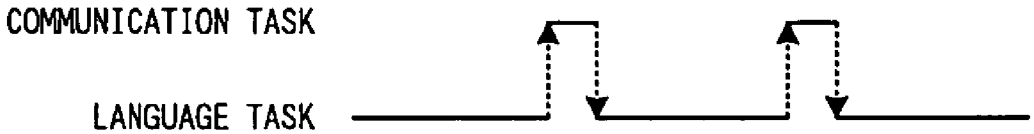

Meanwhile, in step 802, if it is determined that the occupancy time has not yet elapsed, the scheduling manager 71 determines whether there has been an interrupt from the received data monitor 47 (step 804). If the scheduling manager 71 determines that there has been an interrupt, it checks the status of the network memory 231 as notified from the received data monitor 47 (step 805). Specifically, if it is determined that a large amount of received data is stored in the network memory 231, i.e., that there is little free capacity in the network memory 231, the processor occupancy time of the communication task is altered to be longer than that of the language task (step 809). In contrast, if it is determined that a small amount of received data is stored in the network memory 231, i.e., that there is much free capacity in the network memory 231, the processor occupancy time of the language task is altered to be longer than that of the communication task (step 808). The result of this is that the relative processor occupancy times between the communication task and language task are altered on the basis of the amount of received data. FIG. 9 is a diagram of the processor occupancy time of the tasks. The scheduling manager 71 switches the settings between the processor occupancy times so that the states indicated by (a) and (b) in FIG. 9 occur.

Meanwhile, if it is determined in step 804 that there has been no interrupt from the received data monitor 47, then the scheduling manager 71 determines whether there has been an interrupt from the job data monitor 48 (step 806). If the scheduling manager 71 determines that there has been an interrupt from the job data monitor 48, it checks the status of the work memory 232 as notified from the received job data monitor 47 (step 807). Specifically, if it is determined that a small amount of job data is stored in the work memory 232, i.e., that there is much free capacity in the work memory 232, the processor occupancy time of the communication task is altered to be longer than that of the language task (step 808). In contrast, if it is determined that much job data is stored in the work memory 232, i.e., that there is little free capacity in the work memory 232, the processor occupancy time of the language task is altered to be longer than that of the communication task (step 809). The result of this is that the relative processor occupancy times between the communication task and language task are altered on the basis of the amount of job data, just as with the amount of received data.

Thus, with this embodiment, the relative processor occupancy times between the communication task and the language task are altered on the basis of the amount of received data or the amount of job data, so the processor occupancy time can be allocated according to the amount of data to be processed. This allows the CPU to be utilized more efficiently.

The above embodiments are examples given for the purpose of describing the present invention, and do not serve to limit the present invention to just these embodiments. As long as the gist thereof is not exceeded, the present invention can be implemented in a wide variety of aspects. For instance, the operation of the above-mentioned function realization means was described sequentially, but this is not necessarily the case. Therefore, as long as there is no conflict in the operation, the order of the processing may be switched or the operation may be in parallel.

The entire disclosure of Japanese Patent Application No. 11-28739 filed on Feb. 5, 1999, including specification, claims, drawings, and summary, is incorporated herein by reference in its entirety.

What is claimed is:

1. A network printer controller comprising:

communication control means for receiving packet data from host computers via a network, storing the received packet data in a first memory, extracting print job data on the basis of the received packet data, and storing the print job data in a second memory;

language control means for generating image data on the basis of said print job data;

print control means for controlling a print engine;

execution means for exclusively executing either said communication control means, said language control means, or said print control means according to priorities assigned to each of these means;

alteration means for altering, on the basis of specific events, the relative priority sequence based on the priority between said communication control means and said language control means; and first monitoring means for generating said specific events on the basis of the amount of packet data stored in said first memory.

2. The network printer controller according to claim 1, wherein said alteration means raises the priority of said language control means higher than the priority of said communication control means when said first monitoring means decides that the amount of packet data stored in said first memory is below a specific value.

3. The network printer controller according to claim 1, wherein said alteration means raises the priority of said communication control means higher than the priority of said language control means when said first monitoring means decides that the amount of packet data stored in said first memory is over a specific value.

4. A network printer controller comprising:

communication control means for receiving packet data from host computers via a network and extracting print job data on the basis of the received packet data;

language control means for generating image data on the basis of said print job data;

print control means for controlling a print engine;

execution means for exclusively executing either said communication control means, said language control means, or said print control means according to priorities assigned to each of these means;

alteration means for altering, on the basis of specific events, the relative priority sequence based on the priority between said communication control means and said language control means;

a second memory for storing the print job data extracted by said communication control means; and second monitoring means for determining the amount of print job data stored in said second memory and generating specific events on the basis of the results of this determination.

5. The network printer controller according to claim 4, wherein said alteration means raises the priority of said communication control means higher than the priority of said language control means when said second monitoring means decides that the amount of print job data stored in said second memory is below a specific value.

6. The network printer controller according to claim 4, where said alteration means raises the priority of said language control means higher than the priority of said communication control means when said second monitoring means decides that the amount of print job data stored in said second memory is over a specific value.

7. A task control method for controlling an execution of a plurality of tasks, comprising the steps of:

receiving packet data from a network and generating a communication task for storing the received packet data in a first memory, extracting print job data on the basis of the received packet data, and storing the print job data in a second memory, a language task for generating image data on the basis of said print job data, and a printing task for controlling a print engine;

exclusively executing either said communication task, language task, or printing task according to priorities assigned to each of these tasks; and altering, on the basis of specific events, the relative priority sequence based on the priority between said communication control means and said language control means; and generating said specific events on the basis of the amount of packet data stored.

8. A computer program product embodied in a computer readable medium to be executed by a processor of a network printer, comprising;

a communication module for receiving packet data from host computers via a network, storing the received packet data in a first memory, extracting print job data on the basis of the received packet data, and storing the print job data in a second memory;

a language module for generating image data on the basis of said print job data;

a print module for controlling a print engine;

an execution module for exclusively executing either said communication module, said language module, or said print module according to priorities assigned to each of these modules;

an alteration module for altering, on the basis of specific events, the relative priority sequence based on the priority between said communication module and said language module; and first monitoring means for generating said specific events on the basis of the amount of packet data stored in said first memory.

9. A network printer comprising:

a controller;

a print engine for printing on a print recording medium; and a communication interface connected to a network such that communication with host computers is possible;

said controller comprising:

communication control means for receiving packet data from host computers via a network, storing the received packet data in a first memory, extracting print job data on the basis of the received packet data, and storing the print job data in a second memory;

language control means for generating image data on the basis of said print job data;

print control means for controlling a print engine;

execution means for exclusively executing either said communication control means, said language control means, or said print control means according to priorities assigned to each of these means;

alteration means for altering, on the basis of specific events, the relative priority sequence based on the priority between said communication control means and said language control means; and first monitoring means for generating said specific events on the basis of the amount of packet data stored in said first memory.

10. A network printer controller comprising:

communication control means for receiving packet data from host computers via a network, storing the received packet data in a first memory, extracting print job data on the basis of the received packet data, and storing the print job data in a second memory;

language control means for generating image data on the basis of said print job data;

print control means for controlling a print engine;

execution means for exclusively executing either said communication control means, said language control means, or said print control means; and alteration means for altering, on the basis of specific events, the relative time proportions between the execution time in which said execution means is to execute said communication control means and the execution time in which said execution means is to execute said language control means.

11. The network printer controller according to claim 10, further comprising:

first monitoring means for generating said specific events on the basis of the amount of packet data stored in said first memory.

12. The network printer controller according to claim 11, wherein said alteration means raises the priority of said language control means higher than the priority of said communication control means when said first monitoring means decides that the amount of packet data stored in said first memory is below a specific value.

13. The network printer controller according to claim 11, wherein said alteration means raises the priority of said communication control means higher than the priority of said language control means when said first monitoring means decides that the amount of packet data stored in said first memory is over a specific value.

14. A printer controller comprising:

communication control means for receiving packet data from host computers via a network and extracting print job data on the basis of the received packet data;

language control means for generating image data on the basis of said print job data;

print control means for controlling a print engine;

execution means for exclusively executing either said communication control means, said language control means, or said print control means; and alteration means for altering, on the basis of specific events, the elative time proportions between the execution time in which said execution means is to execute said communication control means and the execution time in which said execution means is to execute said language control means;

a second memory for storing the print job data extracted by said communication control means; and second monitoring means for determining the amount of print job data stored in said second memory and generating specific events on the basis of the results of this determination.

15. The network printer controller according to claim 14, wherein said alteration means raises the priority of said communication control means higher than the priority of said language control means when said second monitoring means decides that the amount of print job data stored in said second memory is below a specific value.

16. The network printer controller according to claim 14, wherein said alteration means raises the priority of said language control means higher than the priority of said communication control means when said second monitoring means decides that the amount of print job data stored in said second memory is over a specific value.

17. A task control method for controlling an execution of a plurality of tasks, comprising the steps of:

receiving packet data from host computers via a network and generating a communication task for storing the received packet data in a first memory, extracting print job data on the basis of the received packet data, and storing the print job data in a second memory, a language task for generating image data on the basis of said print job data, and a printing task for controlling a print engine;

exclusively executing either said communication task, language task, or printing task; and altering, on the basis of specific events, the relative time ratio between the execution time in which said execution means is to execute said communication control means and the execution time in which said execution means is to execute said language control means.

18. A computer program product embodied in a computer readable meduim to be executed by a processor of a network printer, comprising;

a communication module for receiving packet data from host computers via a network, storing the received packet data in a first memory, extracting print job data on the basis of the received packet data, and storing the print job data in a second memory;

a language module for generating image data on the basis of said print job data;

a print module for controlling a print engine;

an execution module for exclusively executing either said communication module, said language module, or said print module; and an alteration module for altering, on the basis of specific events, the relative time ratio between the execution time in which said execution module is to execute said communication control module and the execution time in which said execution module is to execute said language control module.

19. A network printer comprising:

a controller;

a print engine for printing on a print recording medium; and a communication interface connected to a network such that communication with host computers is possible;

said controller comprising:

communication control means for receiving packet data from host computers via a network, storing the received packet data in a first memory, extracting print job data on the basis of the received packet data, and storing the print job data in a second memory;

language control means for generating image data on the basis of said print job data;

print control means for controlling a print engine;

execution means for exclusively executing either said communication control means, said language control means, or said print control means; and alteration means for altering, on the basis of specific events, the relative time ratio between the execution time in which said execution means is to execute said communication control means and the execution time in which said execution means is to execute said language control means.

* * * * *